(12) United States Patent
Teyeb et al.

(10) Patent No.: US 8,248,941 B2
(45) Date of Patent: Aug. 21, 2012

(54) METHOD, APPARATUS AND COMPUTER PROGRAM FOR UPLINK SCHEDULING IN A NETWORK THAT EMPLOYS RELAY NODES

(75) Inventors: Oumer Teyeb, Aalborg (DK); Vinh V. Phan, Oulu (FI); Bernhard Raaf, Neuried (DE); Claudio Rosa, Randers (DK)

(73) Assignee: Nokia Siemens Networks Oy, Espoo (FI)

( * ) Notice: Subject to any disclaimer, the term of this patent is extended or adjusted under 35 U.S.C. 154(b) by 691 days.

(21) Appl. No.: 12/012,338

(22) Filed: Feb. 1, 2008

(65) Prior Publication Data
US 2009/0196177 A1 Aug. 6, 2009

(51) Int. Cl.
*H04L 12/26* (2006.01)
(52) U.S. Cl. .................. 370/235; 370/253; 370/254
(58) Field of Classification Search .......... 370/231–234, 370/252–253, 328–329, 346, 338
See application file for complete search history.

(56) References Cited

U.S. PATENT DOCUMENTS

| | | | |
|---|---|---|---|
| 5,493,566 A * | 2/1996 | Ljungberg et al. | 370/231 |
| 6,690,646 B1 * | 2/2004 | Fichou et al. | 370/231 |
| 6,715,007 B1 * | 3/2004 | Williams et al. | 710/52 |
| 6,775,293 B1 * | 8/2004 | Robotham et al. | 370/412 |
| 6,778,499 B1 * | 8/2004 | Senarath et al. | 370/232 |
| 6,993,342 B2 * | 1/2006 | Kuchibhotla et al. | 455/450 |
| 7,023,823 B2 * | 4/2006 | Herrmann et al. | 370/335 |
| 7,035,221 B2 * | 4/2006 | Furukawa et al. | 370/238 |
| 7,047,310 B2 * | 5/2006 | Bedekar et al. | 709/232 |
| 7,218,891 B2 * | 5/2007 | Periyalwar et al. | 455/13.1 |

(Continued)

FOREIGN PATENT DOCUMENTS

EP 1 599 063 A1 11/2005

(Continued)

OTHER PUBLICATIONS

Samsung, Buffer Status Reporting, XP-002522065, Tdoc R2-074265, Shanghai, China Oct. 8-12, 2007.

(Continued)

*Primary Examiner* — Ricky Ngo
*Assistant Examiner* — Ben H Liu
(74) *Attorney, Agent, or Firm* — Harrington & Smith

(57) ABSTRACT

User equipments UEs send their buffer status reports and data to a relay node RN. The RN stores the data in actual buffers per radio bearer group RBG, and stores the UEs buffer occupancies in virtual buffers per RBG. The RN then sends its own status report to the controlling eNBr with the actual buffer occupancy and information about the virtual buffer occupancy. This enables the eNBr to know in advance the volume of data incoming to the RN's actual buffers, as well as the current occupancy of those buffers, so as to better allocate radio resources. Further, the RN can take soundings of the uplink channels between UEs and the RN, which are then aggregated across the RBRs and sent to the eNBr as a special UL CQI report. The eNBr is thereby enabled to anticipate how soon the data in the UE buffers will appear in the RN's actual buffers (from the additional information of average UL CQI info and virtual buffer status), and thus better allocate the RBRs to be used for the different RBGs in the RN-eNB link as well as the optimal set of RBRs to the UE-RN link, which the RN can redistribute among the UEs that it is serving.

28 Claims, 5 Drawing Sheets

U.S. PATENT DOCUMENTS

| | | | | |
|---|---|---|---|---|
| 7,230,917 | B1 * | 6/2007 | Fedorkow et al. | 370/229 |
| 7,418,002 | B2 * | 8/2008 | Robotham et al. | 370/412 |
| 7,477,604 | B2 * | 1/2009 | Moon et al. | 370/235 |
| 7,551,596 | B2 * | 6/2009 | Kim et al. | 370/349 |
| 7,590,064 | B1 * | 9/2009 | Zhang et al. | 370/235 |
| 7,852,764 | B2 * | 12/2010 | Yamaguchi et al. | 370/231 |
| 2005/0047393 | A1 * | 3/2005 | Liu | 370/352 |
| 2006/0126507 | A1 * | 6/2006 | Nakayasu | 370/229 |
| 2006/0268798 | A1 * | 11/2006 | Kim et al. | 370/338 |
| 2007/0091805 | A1 * | 4/2007 | Ramprashad et al. | 370/230.1 |
| 2007/0091817 | A1 * | 4/2007 | Yoon et al. | 370/252 |
| 2007/0183321 | A1 * | 8/2007 | Takeda et al. | 370/229 |
| 2007/0258433 | A1 * | 11/2007 | Speight | 370/349 |
| 2008/0137585 | A1 * | 6/2008 | Loyola et al. | 370/315 |
| 2008/0285500 | A1 * | 11/2008 | Zhang et al. | 370/315 |
| 2009/0034458 | A1 * | 2/2009 | Horn et al. | 370/329 |
| 2009/0036138 | A1 * | 2/2009 | Horn et al. | 455/450 |
| 2009/0052420 | A1 * | 2/2009 | Fischer | 370/338 |
| 2009/0207730 | A1 * | 8/2009 | Stamoulis et al. | 370/230.1 |
| 2009/0252065 | A1 * | 10/2009 | Zhang et al. | 370/256 |

FOREIGN PATENT DOCUMENTS

WO    WO 2007/147431 A1    12/2007

OTHER PUBLICATIONS

Nokia, Buffer Reporting for E-UTRAN, XP003013941, R2-060829, Athens, Greece Mar. 27-31, 2006.

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society Sponsored by the LAN/MAN Standards Committee IEEE Std 802.16e™-2005 and IEEE Std 802.16™-2004/Cor1-2005 (Amendment and Corrigendum to IEEE Std 802.16-2004).

Draft Standard for Local and Metropolitan Area Networks Part 16: Air Interface for Fixed and Mobile Broadband Wireless Access Systems Multihop Relay Specification Aug. 8, 2007 IEEE P802.16j/D1 (Aug. 2007).

* cited by examiner

METHOD, APPARATUS AND COMPUTER PROGRAM FOR UPLINK SCHEDULING IN A NETWORK THAT EMPLOYS RELAY NODES

TECHNICAL FIELD

The exemplary and non-limiting embodiments of this invention relate generally to wireless communications systems and, more specifically, relate to the communication of channel quality information for channels in a network that uses relay nodes, and further how that information may be used for scheduling decisions.

BACKGROUND

The following abbreviations are used in the description below:

| | |
|---|---|
| 3GPP | third generation partnership project\ |
| BSR | buffer status report |
| CQI | channel quality information |
| DL | downlink |
| e-NodeB | Node B of an E-UTRAN system |
| eNBr | relay-enhanced eNB |
| E-UTRAN | evolved UTRAN |
| LTE | long term evolution of 3GPP |
| Node B | base station or similar network access node, including e-NodeB |
| PRBs | physical resource blocks |
| RAN | radio access network |
| RB | radio bearer |
| RBG | radio bearer group |
| RBR | radio band resource |
| RN | relay node |
| RS | relay station |
| QoS | Quality of Service |
| UE | user equipment (e.g., mobile equipment/station) |
| UL | uplink |
| UMTS | universal mobile telecommunications system |
| UTRAN | UMTS terrestrial radio access network |

3GPP is standardizing the long-term evolution (LTE) of the radio-access technology which aims to achieve reduced latency, higher user data rates, improved system capacity and coverage, and reduced cost for the operator. Future LTE standard releases (here termed release 9 for brevity) may use relay nodes (RNs), alternatively termed relay stations (RSs), in order to enhance coverage areas in the cell of an e-NodeB. FIG. 1 gives an overview of how such RNs can be used to advantage: to extend wireless coverage to the interior of a building, to extend coverage beyond the cell edge (cell edge as defined by the radio range from the e-NodeB), to direct radio signals more particularly to a valley between buildings or to a radio-frequency 'shadow' behind a building, to extend the cell to other non-contiguous areas such as via multi-hops/multi-relays, and to provide robust radio signals in any other 'coverage holes' that may be at different areas of the cell. The RNs can be fixed or mobile, such as mounted to a high-speed train. In some systems the relay stations may be opportunistically available UEs/mobile terminals that are not owned by the network itself. For clarity, a network access node that employs RNs is termed a relay enhanced access node, or in the context of LTE it is termed an e-NBr for brevity.

Apart from this main goal of coverage extension, introducing relay concepts can also be used to aid in the provisioning of high-bit-rate coverage in high shadowing environment, to reduce the average radio-transmission power at the UE which extends the UE's battery life, to enhance cell capacity and effective throughput (e.g., by increasing cell-edge capacity and balancing cell load), and to enhance overall performance and deployment cost of the radio access network RAN.

After being carefully considered in pre-standardization activities like the Wireless World Initiative WWI/Wireless World Initiative New Radio WINNER system concept, relay systems are achieving the level of maturity that is needed in ongoing LTE standardization activities. The WINNER concept seeks to develop a system that is QoS aware and uses intelligent scheduling to meet user demands and physical constraints, in a model that is scalable for deployment to any of various spectrum types and bandwidths including spectrum sharing. This scalable deployment gives rise to relay nodes being an important part of the WINNER concept. As an example of later stages of relay node development, the IEEE 802.16j standardization adds relays to the IEEE 802.16e standard. This recent development has increased the pressure to consider relays also in LTE standardization. Certain wireless network operators have been actively pushing for relay standardization since it is expected that relay systems will be economically viable due to reduced backhaul and site acquisition costs. In order to keep LTE competitive it is more than probable that relay extensions to LTE are to be studied within 3GPP in the release 9. Various topics will be studied and relays appear likely to play an important role in LTE Release 9, and RSs are likely to be included in the LTE Release 9 agenda.

There are many specific types of relay systems proposed, from the simple (e.g., amplify/forward implementations, applied in single frequency networks such as digital video broadcast for handhelds DVB-H, for example) to the more complex such as using network coding to improve the overall performance. A common relay type that is proposed for cellular relaying is a detect/forward type of relay, where an input signal is detected and retransmitted using the same procedure as in the original transmission. The following discussion assumes the detect/forward type implementation for a relay network.

To ensure economic viability in adopting RNs into the LTE network, backward compatibility between Release 8 (standardization ongoing) and Release 9 will be needed. A reasonable assumption is that full backward compatibility is required from the UE perspective, i.e. Release 8 and Release 9 terminals should work equally well in Release 8 and in Release 9 networks. At the network side software and even hardware updates between standard releases may be possible but preferably they should be as small as possible. Hence, from the UE viewpoint the serving network node should function in exactly the same way as the e-NodeBs of Release 8. Due to this requirement, the reduction of functionalities of the e-NodeB when defining and implementing relay nodes will be difficult, and the relay nodes will need to support all of the main e-NodeB functions also. Due to this fact it can be assumed that relay nodes are capable of flexible resource sharing with the e-NodeB that controls them.

The introduction of RNs can have an impact on the overall architecture of the network as well as the UL scheduling and the exchange of buffer status report (BSR) noted above. The scheduling of UEs under control of a RN can be done by the RN with the help of the controlling e-NodeB (e.g., where the RN is given some authority to schedule radio resources given by the e-NodeB), or solely by the controlling eNBr (where the RN acts as a communication conduit and all scheduling decisions are by the e-NodeB).

Certain problems arise in the former case. The RN may be doing the scheduling, but it may still be advantageous that the controlling eNodeB have some information as to buffer status as well as the quality of the UE's UL access links so as to schedule resources (those it reserves to itself and those it allocates to the RN) to efficiently meet the demands on both the UE's access links to the RN and also the RN's relay link to the e-NodeB.

In Release 8 of LTE, uplink UL BSR, referring to the amount of buffered data in the logical channel queues in UE (which may be in the Medium Access Control or higher logical protocol layer), are needed in order to provide support for quality of service (QoS)—aware packet scheduling. Radio bearers (RBs) that have similar QoS requirements are grouped under a radio bearer group (RBG), and currently proposals to LTE are for a total of four RBGs. The UE sends a BSR of the RBGs to the e-NodeB. The e-NodeB then considers the BSRs from the UEs that it is serving, the channel quality that each UE is experiencing in the UL (from UL sounding measurements), and schedules the different UEs accordingly.

Each RB in the UE is given a priority, a prioritized bit rate (PBR) and a corresponding maximum bit rate (MBR). The UE tries to schedule all RBs (within the limits of the granted resources from the eNB) in decreasing priority up to their PBR. Once this is done and if the UE has sufficient resources to satisfy all the PBRs, the remaining resources assigned by the grant (i.e. MBR-PBR) are scheduled for each RB, also in decreasing priority. Note that while the scheduling at the e-NodeB is done on a per RBG basis, the final scheduling at the UE is on a per RB basis.

A straightforward implementation of BSR from RN to e-NodeB would simply convey the status of the actual RN buffer. This is not seen as optimal for several reasons. Having the RN simply forward to the controlling e-NodeB each individual BSR report that the RN receives from the relayed UEs will result in fairly high control signaling overhead, which by these teachings will be seen to be unnecessary for the case where the RN is the one responsible for scheduling its UEs. For similar reasons, having the RN simply relay to the e-NodeB each of the CQI values (which are measured by the RN itself) for each of the UE-RN links will also be shown to use an unnecessarily high amount of control signaling overhead.

The introduction of RNs is a new concept in LTE. Thus, UL scheduling and associated BSR reporting has not been considered previously. The case where RNs control the scheduling of its own users is similar to the non-transparent mode defined in WIMAX. However, the issues regarding UL scheduling and BSR reporting are not yet resolved since those are different in LTE.

What is needed in the art is an approach to optimize scheduling of UEs under control of a RN for various actual channel conditions that exist between the RN and the UEs under its control, preferably in a manner that is consistent with LTE.

SUMMARY

In accordance with one aspect of the invention is a method that includes receiving from each of a plurality of user equipments an indication of user data volume waiting to be sent to a relay by the respective user equipment, determining a relay data volume waiting to be sent from the relay, compiling the indications of user data volume and the determined relay data volume into an uplink status report, and sending the uplink status report towards an access node controlling a cell in which the relay and the user equipments operate.

In accordance with another aspect of the invention is an apparatus that include a receiver, a buffer, a processor and a transmitter. The receiver is configured to receive from each of a plurality of user equipments an indication of user data volume waiting to be sent to the apparatus by the respective user equipment. The buffer is configured to store data from at least some of the user equipments that is waiting to be sent. The processor is configured to compile the indications of user data volume and a determined data volume of the buffer into an uplink status report. And the transmitter is configured to send the uplink status report towards an access node controlling a cell in which the apparatus and the user equipments operate.

In accordance with another aspect of the invention is a computer readable memory embodying a program of machine-readable instructions executable by a digital data processor to perform actions directed toward compiling and sending an uplink status report. In this embodiment the actions include receiving from each of a plurality of user equipments an indication of user data volume waiting to be sent to a relay by the respective user equipment, determining a relay data volume waiting to be sent from the relay, compiling the indications of user data volume and the determined relay data volume into an uplink status report, and sending the uplink status report towards an access node controlling a cell in which the relay and the user equipments operate.

In accordance with another aspect of the invention is an apparatus that includes receiving means for receiving from each of a plurality of user equipments an indication of user data volume waiting to be sent to a relay by the respective user equipment, memory means for storing data from at least some of the user equipments that is waiting to be sent, processing means for compiling the indications of user data volume and a determined data volume of the memory means into an uplink status report, and transmitting means for sending the uplink status report towards an access node controlling a cell in which the relay and the user equipments operate. In a particular embodiment, the receiving means is a receiver and the indications are stored in virtual buffers, the memory means is an actual buffer, the processing means is a digital processor, and the transmitting means is a transmitter.

In accordance with another aspect of the invention is a method that includes receiving from a relay node a buffer status report, determining from the buffer status report a volume of data in a queue for the relay node to send and a volume of data waiting to be sent to the relay node, and allocating radio resources to the relay node at least in part depending on the volume of data waiting to be sent to the relay node.

In accordance with another aspect of the invention is an apparatus that includes a receiver, a buffer, a processor and a transmitter. The receiver is configured to receive from a relay node a buffer status report. The processor is configured to determine from the buffer status report a volume of data in queue for the relay node to send and a volume of data waiting to be sent to the relay node, and to allocate radio resources to the relay node at least in part depending on the volume of data waiting to be sent to the relay node. And the transmitter is configured to send the radio resource allocation to the relay node.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

These teachings focus primarily on the case where the RNs take the main responsibility for scheduling their users. In this case, it may not be needed for the e-NodeB to be aware of the actual buffer status of the UEs that is reported to the RN. For reasons noted above it is important from a flow control perspective that the e-NodeB not be wholly unaware of the UE's buffer state and the quality of the UE-RN link. Embodiments of this invention provide a solution to get the needed information to the e-NodeB without excessive signaling overhead. Specifically, embodiments of this invention provide an integrated way of scheduling and controlling the flow of UL data in a relay enhanced LTE network. Two specific mechanisms are detailed: one to summarize and pass the buffer status of relayed UEs to the e-NodeB, and the other to summarize and pass the UL CQI of the UE-RN links to the e-NodeB. The e-NodeB can then use this information for optimal UL scheduling. While specific examples are presented below in the particular context of LTE, the invention is not limited only to LTE but may be employed in any wireless access network that employs relay nodes under control of a controlling access node.

Figure 1:
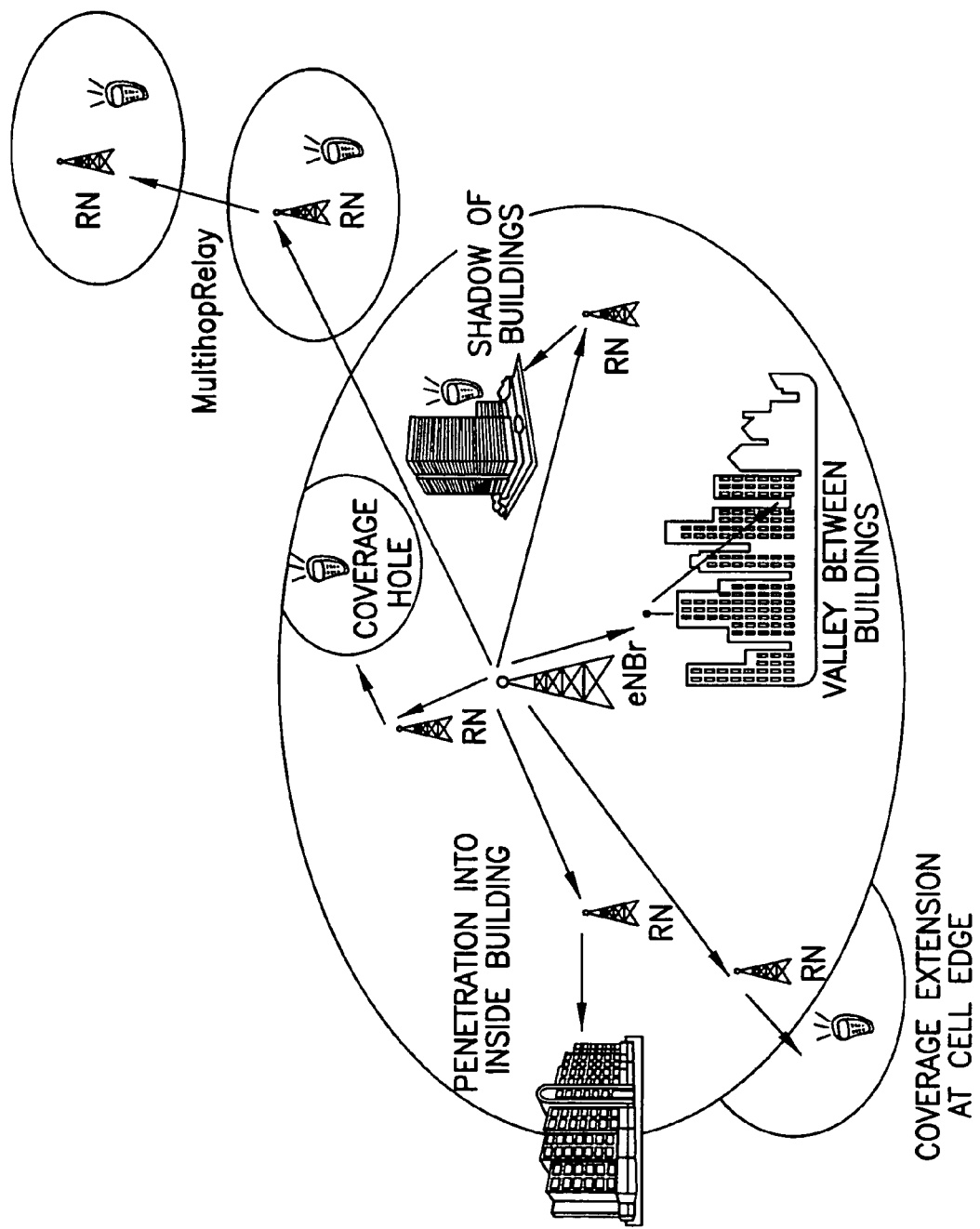
FIG. 1 is a schematic diagram showing a relay network with a controlling access node and various relay nodes serving to enhance coverage for mobile terminals in various scenarios, a context which is relevant to these teachings.

For the description below it is assumed that at maximum two hops are allowed per communication (between UE and e-NodeB or between UE and RN and e-NodeB), and the relay nodes are arranged in a tree topology (no connections between relay nodes). Note that this second assumption excludes two instances shown in FIG. 1. The invention is not limited by either of these two assumptions, but they are noted as constraining the specific examples given rather than the breadth of these teachings. Embodiments of the invention can be used with other network topologies, and/or across more than two-hop links. In this case the relays along the route perform the functions and actions explained below for the e-NodeB towards their subordinate relays and UEs, and the functions and actions explained below for relays towards superordinated relays or the e-NodeB.

Figure 2:
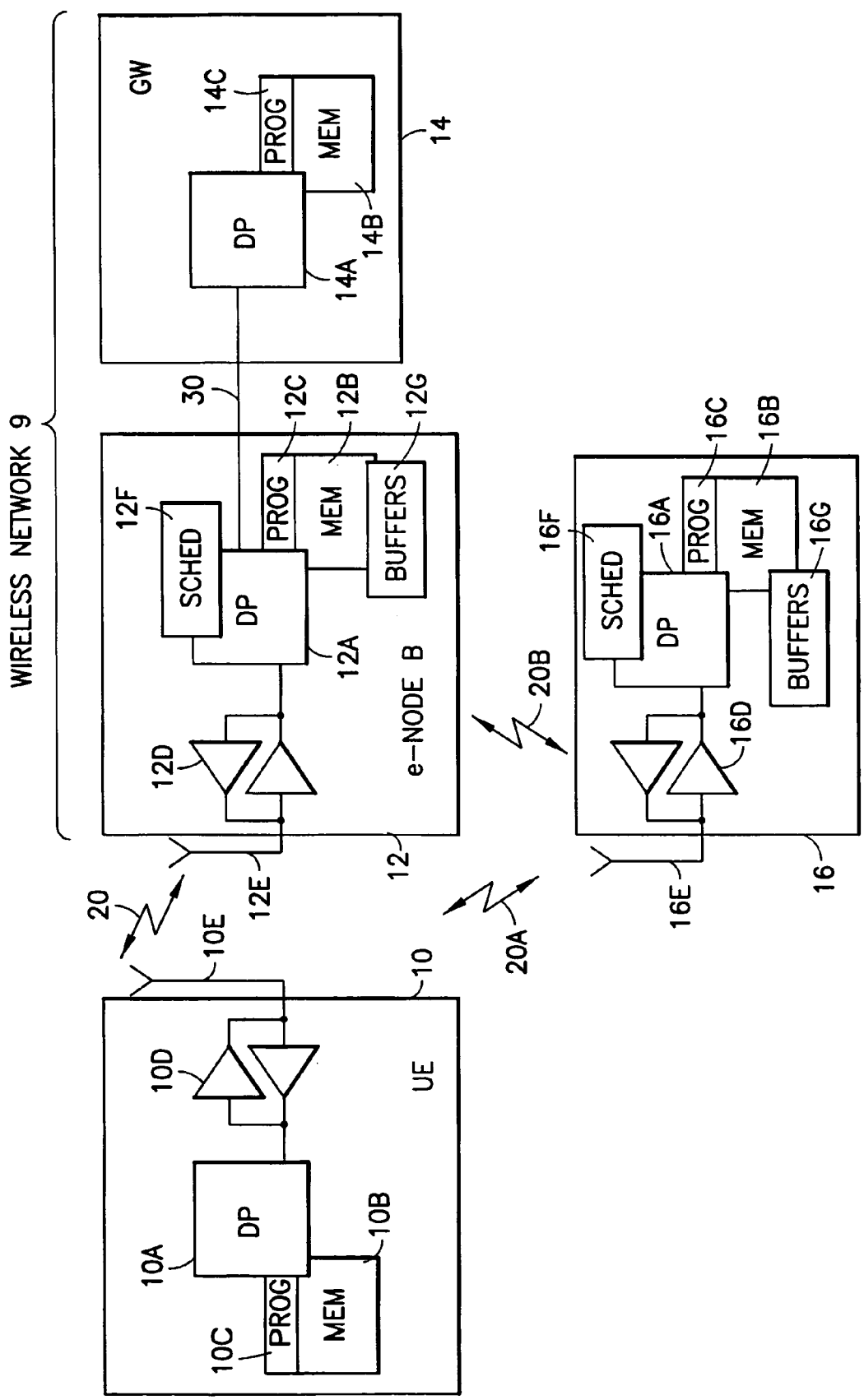
FIG. 2 shows a simplified block diagram of various electronic devices that are suitable for use in practicing the exemplary embodiments of this invention.

As a preliminary matter before exploring details of various implementations, reference is made to FIG. 2 for illustrating a simplified block diagram of various electronic devices that are suitable for use in practicing the exemplary embodiments of this invention. In FIG. 2 a wireless network 9 is adapted for communication between a UE 10 and a Node B 12 (e.g., a wireless access node, such as a base station or particularly an eNBr for a LTE system). The network 9 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the eNBr 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The eNBr 12 also includes a DP 12A, a MEM 12B, that stores a PROG 12C, and a suitable RF transceiver 12D coupled to one or more antennas 12E. The eNBr 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30. Also shown as part of the MEM 12B is a plurality of buffers 12G for storing data and information to be sent over one of the wireless links 20, 20B. These buffers 12G are detailed more particularly below.

Also within the eNBr 12 is a scheduler 12F that schedules the various UEs under its control for the various UL and DL radio resources. Once scheduled, the e-NodeB sends messages to the UEs with the scheduling grants (typically multiplexing grants for multiple UEs in one message). These grants are sent over particular channels such as the PDCCH in LTE. Generally, an e-NodeB of an LTE system is fairly autonomous in its scheduling and need not coordinate with the GW/MME 14 excepting during handover of one of its UEs to another Node B/e-NodeB.

The network also employs a RN 16, shown also as having a DP 16A and a MEM 16B that stores a PROG 16C and which also has its own buffers 16G, and using a transceiver (transmitter and receiver) 16D for communications via at least one antenna 16E over a first link 20A with the UE 10 (as well as other UEs under the RN's control) and over a second link 20B with the eNBr 12 that is controlling in the cell. In the embodiments detailed below, the direct link 20 between the eNBr 12 and the UE 10 is not in active use but instead communications are routed through the RN 16 via the first and second links 20A, 20B. The RN 16 may also have a scheduler 16F for allocating radio resources (RBRs) to the UEs under its control, for the case considered here where the eNBr 12 grants the RN 16 a block of radio resources for use in its area of the cell for allocating to those UEs under the RN's control.

At least one of the PROGs 10C, 12C and 16C is assumed to include program instructions that, when executed by the associated DP, enable the electronic device to operate in accordance with the exemplary embodiments of this invention, as detailed above. Inherent in the DPs 10A, 12A, and 16A is a clock to enable synchronism among the various apparatus for transmissions and receptions within the appropriate time intervals and subframes required, as the scheduling grants and the granted resources/subframes are time dependent. The transceivers 10D, 12D, 16d include both transmitter and receiver, and inherent in each is a modulator/demodulator commonly known as a modem. The DPs 12A, 14A and 16A also are assumed to each include a modem to facilitate communication over the (hardwire) link 30 between the eNBr 12 and the GW 14 and over the various wireless links 20, 20A, 20B shown between the particular electronic apparatuses.

The PROGs 10C, 12C, 16C may be embodied in software, firmware and/or hardware, as is appropriate. In general, the exemplary embodiments of this invention may be implemented by computer software stored in the MEM 16B and executable by the DP 16A of the RN 16 and similar for the other MEM 12B and DP 12A of the eNBr 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Embodiments of the RN may be a UE or may be a fixed or mobile access node under control of the controlling eNBr that is controlling in the cell.

The MEMs 10B, 12B and 16B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 16A may be of any type suitable to the local technical environment, and may include one or more of general purpose computers, special purpose computers, microprocessors, digital signal processors (DSPs) and processors based on a multi-core processor architecture, as non-limiting examples.

Now are described particular embodiments of the invention in detail. As noted above, embodiments of this invention enable integrating the scheduling and controlling of the flow of UL data in a relay enhanced network by two different mechanisms: the RN 16 summarizes and passes the buffer status of relayed UEs 10 to the eNBr 12, and the RN 16 summarizes and passes the UL CQI of the UE-RN links 20A to the eNBr 12. This information can then be used for optimal UL scheduling.

In general terms, the RN receives from each of a plurality of UEs an indication of user data volume to be sent to a relay by the respective user equipment. The RN receives the BSRs of the RBGs from these UEs and stores that information as a 'virtual buffer'. In an embodiment, each virtual buffer is an average of the RBGs across all of the UEs. The RN then determines a relay data volume to be sent from the relay. This is the RN's 'actual' buffer, which is occupancy (percentage) of the uplink data buffer 16G in the RN itself. The RN then compiles the indications of user data volume (the BSRs that are stored as virtual buffers) and the determined relay data volume (the actual buffer 16G) into an uplink status report, which the RN sends to the eNB on the uplink 20B. In a particular embodiment, the RN sends the uplink buffer status report not on a periodic basis, but only when occupancy of the virtual buffer falls below a low threshold or possibly also when the occupancy of the virtual buffer rises above a high threshold.

Figure 3:
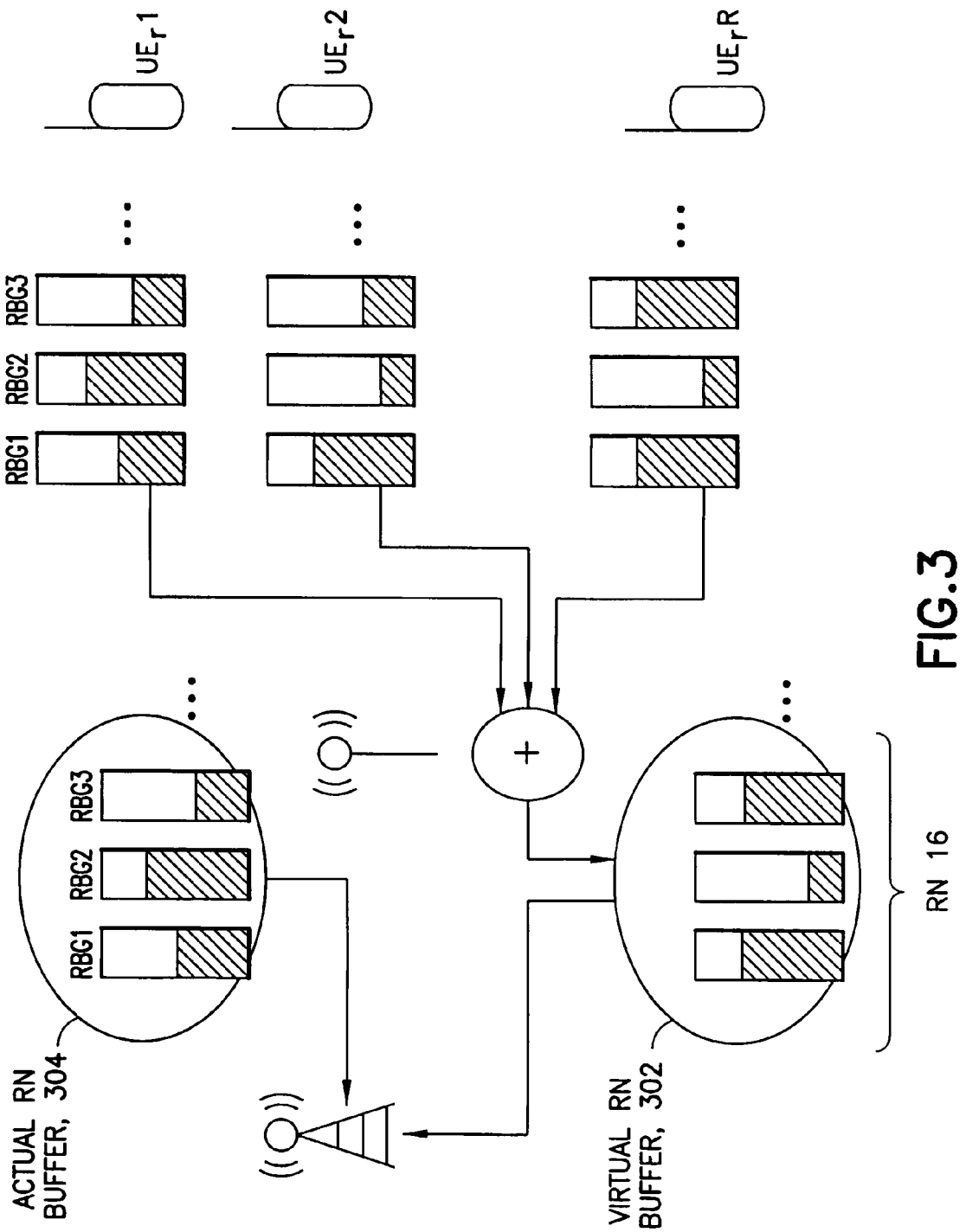
FIG. 3 is a schematic diagram showing buffer status reports received at a relay node RN and compiled into a virtual RN buffer alongside an actual RN buffer according to embodiments of this invention.

FIG. 3 is a schematic diagram illustrating the virtual buffer concept in relation to the actual buffer at the relay node 16. All of the UEs that are under control of the RN 16 are designated in FIG. 3 as $UE_r1$, $UE_r2$, . . . $UE_rR$. It is currently agreed in LTE Release 8 that each of these UEs sends a buffer status report BSR to the RN 16 that summarizes the buffer states for the different RBGs. Thus each of the UEs sends a BSR that delineates data volume waiting to be sent according to the RBGs, shown in FIG. 3 as RBG1, RBG2, RBG3, etc. The RN 16 receives the BSR from each of the UEs that it is serving, compiles them (i.e. for each RBG, adding the buffering values of each UE) and constructs what is termed herein a virtual RN buffer 302.

Additionally in the RN 16, there is also the normal buffering (medium access control (MAC) level buffering or, for more general, L2 radio link level buffering) for the UL data that has been received by the RN but not yet sent out to the eNBr 12. For clarity, this is termed the actual RN buffer 304, which is also shown at FIG. 2 as physical buffers 16G. The actual RN buffer 304 may be separated by RBGs as shown in FIG. 3, so that there is one actual (physical) buffer 12G that transiently stores UL data from the UEs that was sent on the respective BSR until the RN 16 can send that buffered UL data on the uplink 20B to the eNBr 12.

According to these teachings, the RN 16 constructs a BSR that contains information both about the actual RN buffer 304 and the virtual RN buffer 302 and sends it to the eNBr 12. The information about the actual RN buffer 304 is real time, and reflects a volume of data in that actual buffer 12G. The information about the virtual RN buffer 302 is predicting information; the RN 16 does not actually have the data to fill these virtual buffers yet, but it is an indication of the volume of data the UEs have to send to the RN 16. This is because the virtual RN buffer 302 is compiled from the BSRs received from the UEs, not from the data they send. Once they actually do send that data to the RN 16, the data goes to the actual RN buffer 304. The virtual RN buffer 304 is constructed whenever a set of BSRs are received from the UEs.

The virtual RN buffer 302 contains the information about the data that are in the UEs' buffers and that will soon be transferred to the RN 16 and then appear in the actual RN buffer 304. As such the virtual buffer 302 allows the prediction of the future status of the actual buffer 304 of the RN 16. Because any actions that the eNBr 12 takes based on the UEs' BSRs will also only affect the future (and the UEs' BSR information is in that portion of the RN's BSR relating to the virtual buffer that the RN 16 sends to the eNBr 12), the virtual buffer 302 gives better information as it predicts the situation that will be once the UEs' BSRs are taken into account by the eNBr 12. The actual buffer information can be considered as data in queue to be sent to the eNBr 12, and the virtual buffer information can be considered as data next to be in queue to be sent to the eNBr 12, since the actual data underlying the virtual buffer information are yet to be sent to the RN 16 by the UEs. That UE data is not yet in queue at the RN 16, but the virtual RN buffer 302 predicts it for the eNBr 12.

An example will make this explicit. Assume the actual RN buffer 304 is still empty, but there are data to transfer from subordinate UEs to the RN 16 which is already indicated by the BSRs from the UEs that the RN 16 has received. Then the state of the virtual RN buffer 302 is not empty; it will indicate the volume of data reported in the UE BSRs, received at the RN 16, that the UEs are waiting to send to the RN 16. This is indicated towards the eNBr 12 via the RN's BSR signaling: for a combined BSR the actual RN buffer information shows the actual RN buffer is empty and the virtual RN buffer information indicates the volume (per BSG) that the UEs are waiting to send. The eNBr 12 will then allocate the necessary resources to the RN 16 so that the RN's scheduler 16F can redistribute it among the UE-RN links 20A that need it. The eNBr 12 can also already allocate resources for the transfer of the data which is currently at the UEs from the RN 16 to the eNBr 12. This is so that as soon as this next-in-queue data arrives at the RN 16 from the UEs, it can be immediately forwarded from the RN 16 to the eNBr 12. According to the state of the art in LTE, the RN's BSR would only be sent once data have actually arrived in the buffer of the RN, which necessarily means it can only be sent to the eNBr at a later time. Consequently, the embodiment shown by the above example proves there is a reduced latency for transferring data from the UEs to the eNB 12.

Consider another example, which illustrates a similar advantage for the case when there are still data in the actual RN buffer 304 but no data any more in the buffers of the UEs (which means the virtual RN buffer 302 is empty or set to zero percent full). This depletion of the virtual buffer 302 will then be signaled to the eNBr 12 via the inventive RN's BSR signaling, and the eNBr 12 can quickly de-allocate resources for the RN-eNB link 20B. In this way, unnecessary resource allocations for the RN 16 can be avoided because the empty virtual RN 302 reported in the inventive RN BSR allows the eNBr 12 to look forward and see that there will be no further data for the RN-eNBr uplink 20B once the RN's actual buffer 304 is empty. The eNBr 12 now has visibility (via the virtual buffer 302 information) that the buffers at the UEs are getting empty, which means that soon the actual buffer 304 at the RN 16 can be expected to also soon be empty. Consequently, the eNBr 12 can avoid allocating excessive resources on the RN to eNBr link 20B for too long.

Without this prediction information embodied as the virtual buffer 302 information the eNBr 12 would only start to de-allocate resources once it gets an empty (actual) buffer report from the RN 16. Likely in this scenario some resources will be allocated in vain because de-allocation takes some time. The inventors have recognized that the RN 16 is in a position to compile information that predicts when its own (actual) buffer 304 will be filled/re-filled by subordinate UEs, and the invention allows the eNBr 12 to look into their buffers via the virtual buffer information that the RN 16 send it. This gives the eNBr 12 some forecast on the RN (actual) buffer 302 that it can exploit to optimize resource allocation.

This also enables the eNBr 12 to avoid a kind of "bull whip effect" that is often observed in supply chains where a small variation in one end of the chain will cause much larger variation on the other end, because that end has to over-compensate variations due to the incurred delay in the chain. The look ahead capability detailed above via the virtual RN buffer 302 allows the eNBr 12 information to prevent or at least minimize such overshoots due to over compensations.

Typically, the eNBr 12 will know some information about the channel 20B between the RN 16 and the eNBr 12, such as from UL sounding measurements at the eNBr. With the actual RN buffer status, then the eNBr 12 has all the information it needs in order to schedule the RN-eNB link 20B efficiently.

Figure 4:
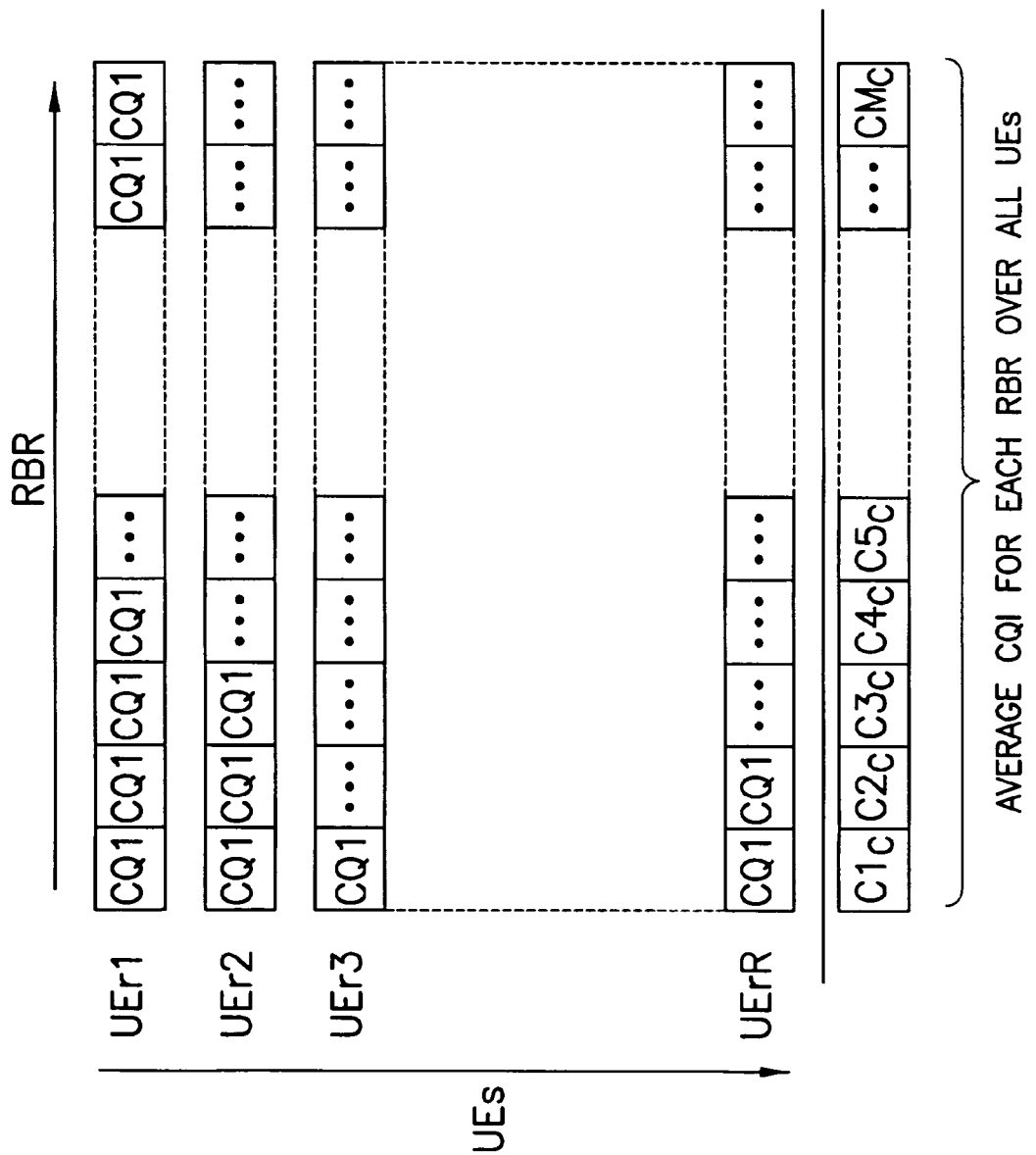
FIG. 4 illustrates channel quality indicators for various UEs under control of a relay node for various radio band resources, arranged in a table, and resulting averages calculated by the relay node for reporting to the access node/e-NodeB according to certain embodiments of the invention.

Above it was noted that the scheduling in the access links (UE-RN) 20A is done by the RN 16. However, the RN 16 still needs to know the set of radio band resources (RBRs) and even particular radio resource blocks that it can distribute among its UEs in order to do so. Though the virtual RN buffer report gives some input to the eNBr 12 in deciding this, the eNBr 12 still needs to have some information regarding the UL link qualities in the access links 20A to make the final decision. Particularly, the eNBr can determine which RBRs, how much and how long those resources should be assigned to the RN so that the RN will have a sufficient amount of resources to schedule for the relayed UEs in UL to transmit the buffered data under the given channel conditions as measured & reported by the RN. The eNBr can also tell the RN (and the UE) how much data should or could be sent. According to another aspect of the invention, the RN 16 provides to the eNBr 12 a summary of the average link quality of the access links 20A which the RN experiences e.g. via its UL channel measurements. In an embodiment, the RN 16 does this by aggregating/averaging the UL CQI for each RBR over all the UEs, as illustrated in FIG. 4. In a particular embodiment relevant to LTE especially, the UL CQI for each RBR is the CQI that is gathered at the RN 16 by the RN's soundings of the UL access links 20A between UE and RN, rather than the DL CQI that is reported by the relayed UEs to the RN 16. However for a TDD system, because the channel is typically reciprocal, also DL CQI can be used to derive UL CQI.

FIG. 4 illustrates in a tabular form the CQI information for the UL access links 20A arranged by UEs ($UE_r1$, $UE_r2$, ... $UE_rR$) along rows and arranged by RBRs along columns (there are a total of R UEs under control of this single RN 16 compiling the table of FIG. 4). Within the table, each of the entries CQI is the CQI value measured by the RN's soundings for the UE 10 of that row for the UL RBR for that column, so each entry is for one UL access link 20A over one RBR. RBR is a frequency band. The lowermost row below the table of CQI values (with entries $C1_C$, $C2_C$, $C3_C$ ... $CM_C$) represent the RBR averaged quality, which in FIG. 4 is specific for the $i^{th}$ RBR column, where there are M RBRs and i is an integer index of the RBRs from 1 thorough M. Note that compressed CQI reporting schemes proposed for LTE Release 8 (e.g., threshold based, Best-M, etc.) can still be used along with the aggregating mechanisms proposed here. Such compression schemes are known in the art and not detailed here further.

Consistent with the teachings above, it is not necessary to convey the CQI information of each UE to the eNBr 12, but it is sufficient to only convey the combined CQI. Above it was noted that one implementation is to signal the average CQI of the UEs that are connected to the RN 16. However a simple average may not always be the best choice. If there are some UEs that need to transfer more data than other UEs then it is better to weight these UEs more than the others. The RN 16 has this information from the UE's BSRs from which it builds the virtual RN buffer 302. Furthermore, there is often no need to include the CQI of UEs that do not have any data in their own buffers to transfer to the RN 16. There may also be situations where data is prioritized, and so it is more important to transfer high priority data and allocate the better quality RBGs to those UEs (or to the RN serving those UEs) that have high priority data. Consequently, the CQI information belonging to UEs should be weighted more heavily if they have to transfer more data and also if they are to transfer higher priority data, as indicated by their BSR. This weighting can be readily done by the RN 16 prior to computing the average, so that the result is a weighted average CQI per RBR.

The RBR averaged quality metric gives an indication on which RBRs are the most suitable for the RN 16. As such, the eNBr 12 can use this information to decide which RBRs can be allocated to RN 16 for the next scheduling period on the UE-RN access link 20A. The RN 16 can pass the RBR averaged quality information conveniently with the virtual RN buffer information in the RN's BSR, or in a separate message. Note that the actual scheduling which one of the UE 10 is scheduled on which RBR can still be done by the RN 16 individually using a block of resources for which the eNBr 12 gives the RN 16 control over, but with the help of RBR averaged quality the eNBr 12 can better decide which RBRs to assign to the RN 16 for the RN-UE links 20A and which other RBRs to use (e.g. for direct transmission) from the eNBr 12 to other, directly served UEs. Additionally, knowledge at the eNBr 12 of the UL access link 20A quality gives the eNBr 12 a better indication of the throughput on those links, and so enables the eNBr 12 to better predict latency between the data in the UE buffers (which it knows from the virtual RN buffer information) to when that data will be present in the RN's actual buffer 304.

Furthermore, if there are RNs 16 in close vicinity to each other, it may be beneficial to allocate at least partly non-overlapping RBRs to both RNs 16 in order to avoid or reduce interference between the two. This is particularly advantageous, if the RNs 16 serve overlapping areas and this may well happen if RN locations are not strictly planned, or if one or more of the RNs are mobile (e.g., on a high-speed train or a bus). The described RBR averaged quality then allows the eNBr 12 to assign the RBRs optimally to the RNs 16 (i.e. each gets the RBRs that will give optimum UL performance for the assigned UEs 10).

To implement the above aspects of the invention in an LTE system, no changes are required at the UEs 10 as compared with UEs according to the current LTE release. However, there are seen to be two major changes at the eNBr 12. The first is the acceptance of two different BSRs from the RN, one for the actual and another one for the virtual buffer status. As noted above, these can be combined or can be separate, but in fact there are two different buffer statuses being reported however many messages it takes to report them. On advantageous manner for combining the information on these two buffers (actual and virtual) into a single message with little control signalling overhead is to report one explicitly and report the other as a gain factor to the explicitly reported buffer. For example, a normalized virtual buffer can be the gain factor. The actual buffer status is multiplied by this gain factor, and the result is then reported explicitly in the RN's BSR. Without the gain factor, such an implementation would lead to a BSR mechanism that is similar to one existing between UEs that are directly connected to an eNB (without a RN), but this will make the eNB almost blind to the actual demands of the UEs. Hence, optimal scheduling in the UE-RN link 20A becomes difficult, as the eNBr 12 would be allocating the PRBs to be used for the UE-RN links 20A. However, if fixed allocation is used (where the RN 16 has certain PRBs allocated to it permanently when it is allowed to transmit) and there is full orthogonality between the PRBs used by the direct and relayed UEs, the implicit BSR reporting is an attractive solution.

The second major change seen for the eNBr 12 is the passing of the average or aggregated UL CQI in the access links 20A. In a non-relayed LTE system, there is no CQI reporting mechanism in the UL (i.e. the UL CQIs are calculated where they are needed for scheduling, at the eNB). As such, the average UL CQI in the access links 20A cannot be implicitly passed along; other CQI reports and a new explicit signaling has to be defined in order to enable it. If there is only one RN 16 per eNBr 12, then it might be sufficient just to provide the list of favorable RBRs, without explicit quality information for the RBRs. However, when there is more than one RN 16 per eNBr 12, more detailed quality information would be advantageous since the eNBr 12 has to decide to which RN 16 to give the control of a certain RBR for the case where both (or more) RNs 16 find it to be favorable.

Based on this aggregated UL CQI information, the eNBr 12 can select the optimum RBRs to be allocated to the different RNs 16 so that each RN 16 gets those RBRs that it can make best use of for scheduling the UEs in its vicinity. Consider an example: there are two RNs and each RN 16 only serves a single UE. Then the RNs will basically forward the CQI information from their UEs to the eNBr 12. The eNBr 12 will allocate the RBRs based on these received CQI information to the two RNs. It will use a similar algorithm to assign RBRs to RNs as it would use to assign RBRs to UEs, if the UEs were directly connected to the eNB. Subsequently the RNs can assign these allocated RBRs to their UEs and the UEs will get suitable RBRs. If the CQI information was not available at the eNBr 12 it could not assign the optimum RBRs to the RNs and then these could not assign optimum RBRs to the UEs.

The above example assumes full re-use; that no two of the RNs can use the same RBR at the same time. However, this can be generalized for the case that the same RBR can be used by several RNs e.g. every Nth (reuse N) or even every second (reuse 2) or that the reuse factor is selected adaptively. These teachings still enable the assignment of the optimum set of RBRs to each RN, regardless of whether those RBRs are reused simultaneously or not. Even for reuse 1, where all RNs can use all RBRs concurrently, the invention allows the eNBr 12 (and the RNs 16) to select the RBRs that allow the best performance, when used by all RNs, while other RBRs can still be used for transfer of data between the eNB 12 and other UEs (directly connected UEs). Note that if the traffic load is distributed unevenly between RNs, then the eNBr 12 can weight stronger the RNs that have to carry the most traffic (or more precisely the most traffic, taken also the channel conditions to their subordinate UEs into account) for the eNBr's decision which RBRs to allocate to the RNs.

To summarize then, these teachings enable making necessary uplink status information of the relayed UEs' buffer status and CQI available at the eNBr to facilitate an optimized UL resource scheduling and overall system performance, and also keeping implementation and signaling overhead notably low, that is, backward compatible yet significantly reduced as compared to relaying individual UE status information to the eNBr.

Figure 5:
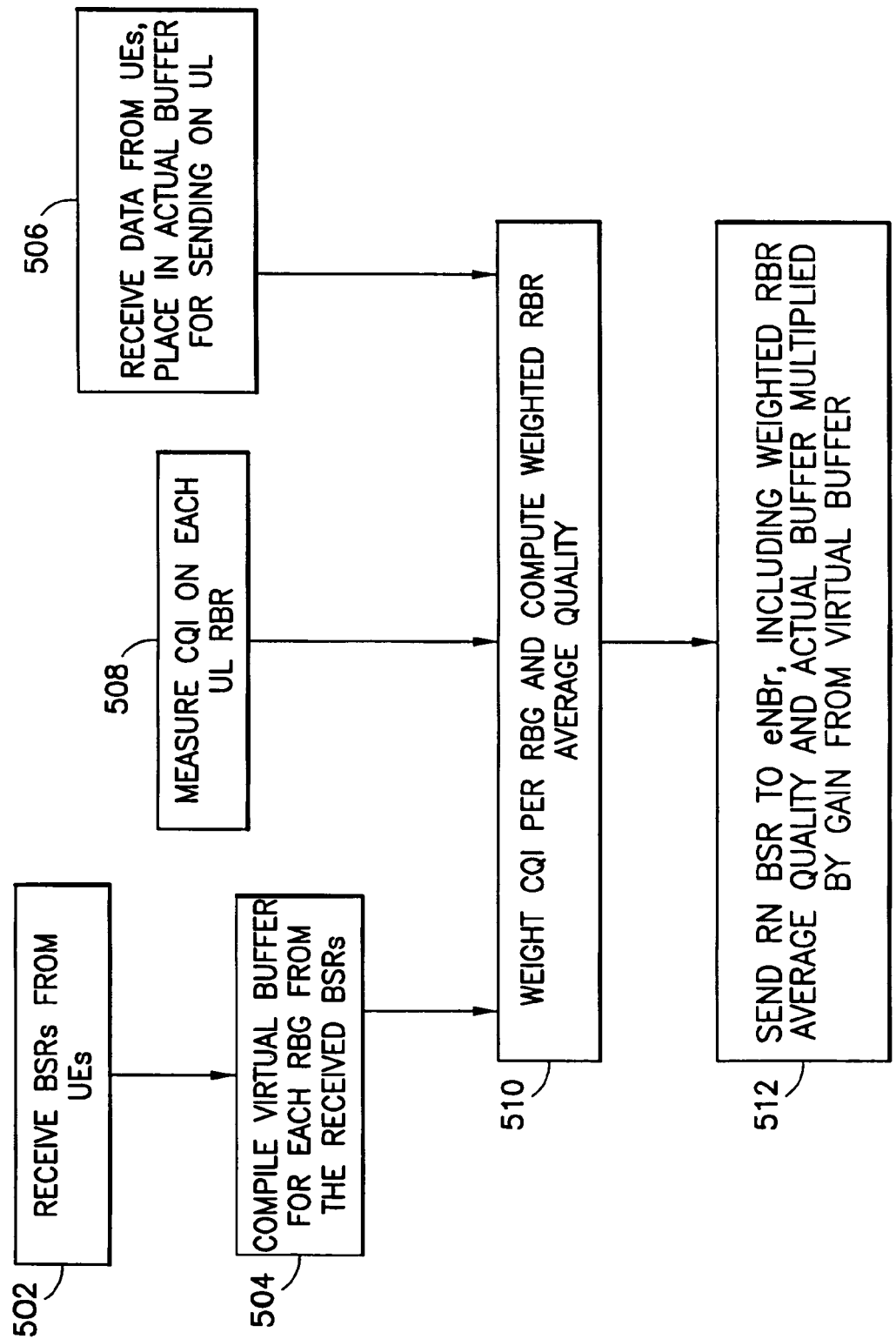
FIG. 5 is a process flow diagram illustrating process steps according to a particular embodiment of the invention.

Some of the major points detailed above are summarized at FIG. 5, a process flow diagram showing certain of the above process steps for implementing aspects of the invention. At block 502 the RN 16 receives the BSRs from the UEs that are particular for each RBG. At block 504 the RN compiles from the BSRs received at block 502 the virtual buffers for each RBG, which represents the volume of data waiting to be sent by the user equipments to the relay node. At block 506 the RN 16 receives data from the UEs, and stores that in actual buffers according to RBG prior to sending it on the UL to the eNBr 12. the occupancy rate of these actual buffers represent volume of data in queue for the relay node to send towards the access node/eNBr. At block 508 the RN 16 does sounding measurements of the UL links 20A from the UEs to the RN 16 for each of the RBRs. The processes of blocks 504, 506 and 508 may be performed in parallel as illustrated, but they may be performed at different times also and in various different orders than was described above. At block 510 the RN 16 weights the sounding CQI measurements according to data priority or other factors that may be pertinent as noted above (e.g., the CQI for a particular UE's link may be weighted with the BSR from that UE), and computes a weighted RBR average quality from it. Finally at block 512, the RN 16 sends to the eNBr 12 a RN buffer status report, which includes the weighted RBR average quality and also the actual buffer occupancy per RBG multiplied by a gain that gives the occupancy of the corresponding virtual buffer for that RBG. The eNBr 12 takes this RN BSR and allocates the RBGs as detailed above.

For the aspects of this invention related to network, embodiments of this invention may be implemented by computer software executable by a data processor of the RN 16, such as the processor 16A shown, or by hardware, or by a combination of software and hardware. For the aspects of this invention related to eNBr 12, embodiments of this invention may be implemented by computer software executable by a data processor of the eNBr 12, such as the processor 12A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   receiving, at a relay, from each of a plurality of user equipments an indication of user data volume waiting to be sent to a relay by the respective user equipment;
   the relay determining a relay data volume waiting to be sent from the relay;
   the relay compiling the indications of user data volume and the determined relay data volume into an uplink status report; and
   the relay sending the uplink status report towards an access node controlling a cell in which the relay and the user equipments operate, wherein the indication of user data volume comprises a user equipment buffer status report and the relay data volume comprises occupancy of an uplink data buffer in the relay, and wherein for each of the user equipments the buffer status report is for individual radio bearer groups and determining the relay data volume is for individual radio bearer groups, and compiling comprises averaging for each radio bearer group across all of the user equipments.

2. The method of claim 1, wherein the buffer status reports are compiled into a virtual buffer at the relay and the uplink data buffer comprises an actual buffer at the relay, and wherein occupancy of the virtual buffer falling below a low threshold or raising above a high threshold is a trigger for sending the uplink status report.

3. A method comprising:
   receiving, at a relay, from each of a plurality of user equipments an indication of user data volume waiting to be sent to a relay by the respective user equipment;
   the relay determining a relay data volume waiting to be sent from the relay;
   the relay compiling the indications of user data volume and the determined relay data volume into an uplink status report; and
   the relay sending the uplink status report towards an access node controlling a cell in which the relay and the user equipments operate, wherein the indication of user data volume comprises a user equipment buffer status report and the relay data volume comprises occupancy of an uplink data buffer in the relay, and wherein the buffer status reports are compiled into a virtual buffer at the relay and the uplink data buffer comprises an actual buffer at the relay, and wherein occupancy of the virtual buffer falling below a low threshold or raising above a high threshold is a trigger for sending the uplink status report.

4. The method of claim 3, further comprising the relay determining quality of uplink radio channels between the user equipments and the relay node, and sending the determined quality to towards the access node.

5. The method of claim 1, further comprising the relay determining quality of uplink radio channels between the user equipments and the relay node, and sending the determined quality to towards the access node.

6. The method of claim 5, wherein the relay determining comprises measuring at the relay the uplink radio channel for each radio band resource per user equipment, computing an average per radio band resource across at least those of the plurality of user equipments whose indication of user data volume is not zero, and wherein sending comprises sending the average quality per radio band resource.

7. The method of claim 6, wherein the average is weighted.

8. The method of claim 1, wherein the relay compiling comprises determining a gain from the indication of user data volume waiting to be sent and applying the determined gain to the determined relay data volume waiting to be sent.

9. The method of claim 1, executed by the relay in an E-UTRAN network, and wherein sending comprises sending to an eNBr or a superordinated relay.

10. An apparatus comprising:
    at least one processor;
    at least one memory including computer program code;
    the at least one memory and the computer program code configured to, with the at least one processor, cause the apparatus at least to;

receive from each of a plurality of user equipments an indication of user data volume waiting to be sent to the apparatus by the respective user equipment;

store data from at least some of the user equipments that is waiting to be sent;

compile the indications of user data volume and a determined data volume of the buffer into an uplink status report; and send the uplink status report towards an access node controlling a cell in which the apparatus and the user equipments operate, wherein the indication of user data volume comprises a user equipment buffer status report and the relay data volume comprises occupancy of an uplink data buffer in the relay, and wherein for each of the user equipments the buffer status report is for individual radio bearer groups and determining the relay data volume is for individual radio bearer groups, and compiling comprises averaging for each radio bearer group across all of the user equipments.

11. The apparatus of claim 10, wherein the at least one processor compiles the buffer status reports into a virtual buffer in a local memory and wherein occupancy of the virtual buffer falling below a low threshold or raising above a high threshold is a trigger for the transmitter to send the uplink status report.

12. The apparatus of claim 10, the at least one processor further configured to determine quality of uplink radio channels between the user equipments and the apparatus, and the transmitter is further configured to send the determined quality towards the access node.

13. The apparatus of claim 12, wherein the apparatus is configured to determine quality of uplink radio channels by measuring at the receiver the uplink radio channel for each radio band resource per user equipment, the at least one processor is configured to compute an average per radio band resource across at least those of the plurality of user equipments whose indication of user data volume is not zero, and wherein the transmitter is configured to send the average quality per radio band resource.

14. The apparatus of claim 13, wherein the average is weighted.

15. The apparatus of claim 10, wherein the apparatus comprises a relay node in an E-UTRAN network, and wherein the transmitter is configured to send the uplink status report to an eNBr or a superordinated relay.

16. A non-transitory computer readable memory embodying a program of machine-readable instructions executable by at least one digital data processor to perform actions, the actions comprising:

receiving from each of a plurality of user equipments an indication of user data volume waiting to be sent to a relay by the respective user equipment;

determining a relay data volume waiting to be sent from the relay;

compiling the indications of user data volume and the determined relay data volume into an uplink status report; and sending the uplink status report towards an access node controlling a cell in which the relay and the user equipments operate wherein the indication of user data volume comprises a user equipment buffer status report and the relay data volume comprises occupancy of an uplink data buffer in the relay, and wherein for each of the user equipments the buffer status report is for individual radio bearer groups and determining tile relay data volume is for individual radio bearer groups, and compiling comprises averaging for each radio bearer group across all of the user equipments.

17. The non-transitory computer readable memory of claim 16, wherein the buffer status reports are compiled into a virtual butter at the relay and the uplink data buffer comprises an actual buffer at the relay, and wherein occupancy of the virtual buffer falling below a low threshold or raising above a high threshold is a trigger for sending the uplink status report.

18. The non-transitory computer readable memory of claim 16, further comprising measuring at the relay quality for each uplink radio band resource per user equipment, computing an average per radio band resource across at least those of the plurality of user equipments whose indication of user data volume is not zero, and sending the average quality per radio band resource.

19. A method comprising:

receiving, at an apparatus, from a relay node a buffer status report;

the apparatus determining from the buffer status report a volume of data in queue for the relay node to send and a volume of data waiting to be sent to the relay node; and the apparatus allocating uplink radio resources to the relay node at least in part depending on the volume of data waiting to be sent to the relay node, wherein the volume of data in queue represents a relay buffer occupancy level per radio bearer group and the volume of data waiting to be sent to the relay node represents buffer occupancy level per radio bearer group for a plurality of user equipments under control of the relay node, and where for each of the user equipments the buffer status report is for individual radio bearer groups, and the buffer status report comprises averaging for each radio bearer group across all of the user equipments.

20. The method of claim 19, wherein the apparatus allocating the uplink radio resources comprises allocating the radio bearer groups.

21. The method of claim 19, further comprising the apparatus receiving from the relay node an indication of link quality for uplink access links between user equipments and the relay node, and wherein allocating the radio resources to the relay node is at least in part also depending on the received link qualities.

22. The method of claim 21, in which the apparatus comprises an eNBr of an E-UTRAN system, and wherein the eNBr determines throughput per radio bearer group based on the received link qualities combined with the volume of data waiting to be sent to the relay node.

23. The method of claim 19, in which the apparatus comprises a superordinated relay node of an E-UTRAN system.

24. An apparatus comprising:

at least one processor;

at least one memory including computer program code;

the at least one memory and the computer program code configured to, with the at least one processor, cause the apparatus at least to;

receive from a relay node a buffer status report;

determine from the buffer status report a volume of data in queue for the relay node to send and a volume of data waiting to be sent to the relay node, and to allocate uplink radio resources to the relay node at least in part depending on the volume of data waiting to be sent to the relay node; and send the radio resource allocation to the relay node, wherein the volume of data in queue represents are relay buffer occupancy level per radio bearer group and the volume of data waiting to be sent to the relay node represents buffer occupancy level per radio bearer group for a plurality of user equipments under control of the relay node, and where for each of the user equipments the buffer status report is for individual radio bearer groups, and the buffer status report comprises averaging for each radio bearer group across all of the user equipments.

25. The apparatus of claim 24, wherein the at least one processor allocates the uplink radio resources according to radio bearer groups.

26. The apparatus of claim 24, further configured to receive from the relay node an indication of link quality for uplink access links between user equipments and the relay node, and wherein the processor is configured to allocate the radio resources to the relay node at least in part also depending on the received link qualities.

27. The apparatus of claim 26, wherein the apparatus comprises an eNBr of an E-UTRAN system, and wherein the at least one processor is configured to determine throughput per radio bearer group based on the received link qualities combined with the volume of data waiting to be sent to the relay node.

28. The apparatus of claim 26, wherein the apparatus comprises a superordinated relay node of an E-UTRAN system.

* * * * *

UNITED STATES PATENT AND TRADEMARK OFFICE
CERTIFICATE OF CORRECTION

PATENT NO. : 8,248,941 B2  
APPLICATION NO. : 12/012338  
DATED : August 21, 2012  
INVENTOR(S) : Teyeb et al.

Page 1 of 1

It is certified that error appears in the above-identified patent and that said Letters Patent is hereby corrected as shown below:

Claim 24, col. 16, line 66 delete "are" and insert --a--.

Signed and Sealed this
Sixteenth Day of October, 2012

David J. Kappos
*Director of the United States Patent and Trademark Office*